United States Patent

Taya

(10) Patent No.: US 9,356,637 B2
(45) Date of Patent: May 31, 2016

(54) POWER-SUPPLY DEVICE, METHOD FOR CONTROLLING THE SAME, AND COMMUNICATION DEVICE INCLUDING THE SAME

(71) Applicant: LAPIS Semiconductor Co., Ltd., Yokohama (JP)

(72) Inventor: Takashi Taya, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 3 days.

(21) Appl. No.: 14/581,517

(22) Filed: Dec. 23, 2014

(65) Prior Publication Data

US 2015/0188429 A1    Jul. 2, 2015

(30) Foreign Application Priority Data

Dec. 26, 2013  (JP) ................. 2013-269384

(51) Int. Cl.
| | |
|---|---|
| *H04B 1/04* | (2006.01) |
| *G05F 1/00* | (2006.01) |
| *H04B 1/16* | (2006.01) |
| *H02J 1/10* | (2006.01) |
| *H02J 9/04* | (2006.01) |

(52) U.S. Cl.
CPC ................ *H04B 1/1607* (2013.01); *H02J 1/10* (2013.01); *H02J 9/04* (2013.01)

(58) Field of Classification Search
CPC .............. H04B 1/1607; H02M 3/156; H02M 3/33507; H02M 3/33569; H02M 2001/0032; G05F 1/66

USPC ............... 455/127.1, 572, 574; 323/234, 235, 323/247, 268, 271, 311, 314

See application file for complete search history.

(56) References Cited

U.S. PATENT DOCUMENTS

| | | | | |
|---|---|---|---|---|
| 5,036,261 | A * | 7/1991 | Testin | H04N 5/63 315/411 |
| 6,157,177 | A * | 12/2000 | Feldtkeller | H02J 9/005 323/267 |
| 6,515,379 | B1 * | 2/2003 | Nojima | H02M 1/10 323/271 |
| 7,065,391 | B2 * | 6/2006 | Kanayama | H04W 52/0229 455/572 |
| 7,346,329 | B2 * | 3/2008 | Motohashi | H04W 52/0235 455/574 |
| 2015/0006932 | A1 * | 1/2015 | Kim | G06F 1/26 713/323 |
| 2015/0180278 | A1 * | 6/2015 | Tsai | H02J 9/061 307/23 |
| 2015/0236587 | A1 * | 8/2015 | Kim | H02M 3/335 323/271 |

FOREIGN PATENT DOCUMENTS

JP    2002-373942  A    12/2002

* cited by examiner

*Primary Examiner* — Quochien B Vuong
(74) *Attorney, Agent, or Firm* — Rabin & Berdo, P.C.

(57) ABSTRACT

Upon sending out a first power-supply voltage having a first value to first and second power supply lines in a first mode and sending out a second power-supply voltage having a second value lower than the first value to the second power supply line in a second mode, when switching a power-supply device from the first mode to the second mode, the value of the first power-supply voltage generated in a first power-supply circuit is changed to the second value first, the first and second power supply lines are temporarily connected together and then cut off from each other, and then the generating operation of the first power-supply voltage is stopped.

7 Claims, 15 Drawing Sheets

POWER-SUPPLY DEVICE, METHOD FOR CONTROLLING THE SAME, AND COMMUNICATION DEVICE INCLUDING THE SAME

BACKGROUND OF THE INVENTION

1. Field of the Invention

The present invention relates to a power-supply device and, in particular, to a power-supply device for generating an internal power-supply voltage from an externally-provided power supply, a method for controlling the power-supply device, and a communication device including the power-supply device.

2. Background Art

As a power-supply device formed in a semiconductor integrated device, a power-supply device including: a power-supply circuit for operation which becomes active in a normal operation; and a standby power-supply circuit which becomes active in a standby state has been proposed (see Japanese Patent Application Laid-Open No. 2002-373942, for example). In such a power-supply device, upon being switched from the normal operation to the standby state, the power-supply circuit for operation stops its operation and the standby power-supply circuit starts its operation instead of the power-supply circuit for operation. Japanese Patent Application Laid-Open No. 2002-373942 describes that a power-supply voltage generated in the standby power-supply circuit is lower than a power-supply voltage generated in the power-supply circuit for operation.

SUMMARY OF THE INVENTION

However, when switching between the above-described power-supply circuits is performed by switches provided in the respective power-supply circuits, a current flows into the lower-voltage standby power-supply circuit from the higher-voltage power-supply circuit for operation due to a slight difference between the switching timings of these switches. Consequently, spike noise may be superimposed on the power-supply voltage generated in the standby power-supply circuit, leading to malfunction of a peripheral circuit as a result of such spike noise. Furthermore, due to the current flowing at the time of switching the power-supply voltage, charging and discharging occur in parasitic capacitance in each of the power-supply circuits or a bypass capacitor connected to a power supply line for suppressing variations in the power-supply voltage, thereby resulting in ineffective power consumption associated with such charging and discharging.

SUMMARY OF THE INVENTION

It is an object of the present invention to provide a power-supply device capable of suppressing power consumption without causing malfunction, a method for controlling the power-supply device, and a communication device including the power-supply device.

A power-supply device according to the present invention is a power-supply device that sends out a first power-supply voltage having a first voltage value to a first power supply line and a second power supply line in a first mode and sends out a second power-supply voltage having a second voltage value lower than the first voltage value to the second power supply line in a second mode. The power-supply device includes: a first power-supply circuit that generates the first power-supply voltage having the voltage value of one of the first and second voltage values and sends out the first power-supply voltage to the first power supply line; a second power-supply circuit that generates the second power-supply voltage; a first switch that connects between the first and second power supply lines in an ON state and cuts off the connection between the first and second power supply lines in an OFF state; a second switch that connects between the second power-supply circuit and the second power supply line in an ON state and cuts off the connection between the second power-supply circuit and the second power supply line in an OFF state; and a power-supply switching control circuit that when switching from the first mode to the second mode, the second mode state is obtained by: changing the voltage value of the first power-supply voltage to be generated in the first power-supply circuit to the second voltage value; then setting the second switch in the ON state; subsequently setting the first switch in the OFF state; and then stopping the operation of the first power-supply circuit, and when switching from the second mode to the first mode, the first mode state is obtained by: generating the first power-supply voltage having the second voltage value in the first power-supply circuit; then setting the first switch in the ON state; subsequently setting the second switch in the OFF state; and then changing the voltage value of the first power-supply voltage to be generated in the first power-supply circuit to the first voltage value.

Moreover, a method for controlling a power-supply device according to the present invention is a method for controlling a power-supply device that connects between a first power supply line and a second power supply line so as to send out a first power-supply voltage having a first voltage value to the first and second power supply lines in a first mode and cuts off the connection between the first and second power supply lines so as to send out a second power-supply voltage having a second voltage value lower than the first voltage value to the second power supply line in a second mode. When switching from the first mode state to the second mode, the second mode state is obtained by sequentially carrying out the steps of: changing the voltage value of the first power-supply voltage to the second voltage value; sending out the second power-supply voltage to the second power supply line; cutting off the connection between the first and second power supply lines; and stopping a generating operation of the first power-supply voltage. When switching from the second mode state to the first mode, the first mode state is obtained by sequentially carrying out the steps of: starting the generating operation of the first power-supply voltage having the second voltage value; connecting between the first and second power supply lines; stopping the sending out of the second power-supply voltage to the second power supply line; and changing the voltage value of the first power-supply voltage to the first voltage value.

Moreover, a communication device including a power-supply device according to the present invention is a communication device including: a communication main circuit part that transmits and receives information data; a standby control circuit that performs incoming standby processing when the communication main circuit part is in a standby state; and a power-supply unit that supplies a first power-supply voltage having a first voltage value to the communication main circuit part and the standby control circuit through a first power supply line and a second power supply line in a communication operation mode and supplies a second power-supply voltage having a second voltage value lower than the first voltage value to the standby control circuit through the second power supply line in a standby mode. The power-supply unit includes: a first power-supply circuit that generates the first power-supply voltage having the voltage value of one of the first and second voltage values and sends out the first power-supply voltage to the first power supply line; a second power-supply circuit that generates the second power-supply voltage; a first switch that connects between the first and second power supply lines in an ON state and cuts off the connection between the first and second power supply lines in an OFF state; a second switch that connects between the second power-supply circuit and the second power supply line in an ON state and cuts off the connection between the second power-supply circuit and the second power supply line in an OFF state; and a power-supply switching control circuit that when switching from the communication operation mode to the standby mode, the standby mode state is obtained by: changing the voltage value of the first power-supply voltage to be generated in the first power-supply circuit to the second voltage value; then setting the second switch in the ON state; subsequently setting the first switch in the OFF state; and then stopping the operation of the first power-supply circuit, and when switching from the standby mode to the communication operation mode, the communication operation mode state is obtained by: generating the first power-supply voltage having the second voltage value in the first power-supply circuit; then setting the first switch in the ON state; subsequently setting the second switch in the OFF state; and then changing the voltage value of the first power-supply voltage to be generated in the first power-supply circuit to the first voltage value.

According to the present invention, in the power-supply device that sends out the first power-supply voltage having the first voltage value to the first and second power supply lines in the first mode and sends out the second power-supply voltage having the second voltage value lower than the first voltage value to the second power supply line in the second mode, the first and second voltage values are not simultaneously applied to the power supply lines when switching the state thereof from the first mode (second mode) to the second mode (first mode). Thus, at the time of mode switching, a current is prevented from flowing into the power-supply circuit for generating the second voltage value and spike noise associated with such a current is prevented from occurring. Therefore, the malfunction of the peripheral circuit resulting from such spike noise and ineffective power consumption can be suppressed.

DETAILED DESCRIPTION OF THE INVENTION

Embodiments of the present invention will now be described below in detail with reference to the drawings.

Figure 1:
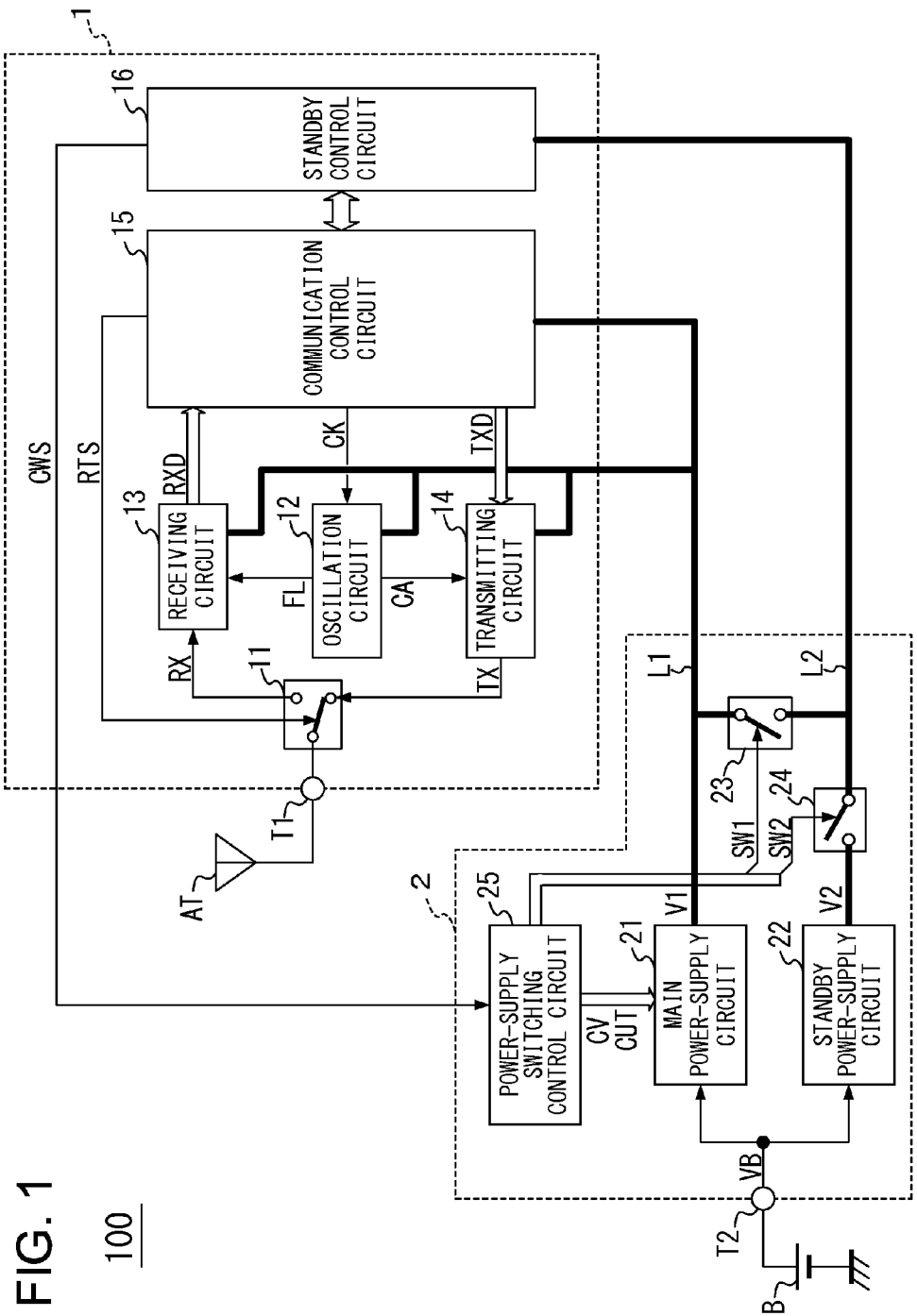
FIG. 1 is a block diagram illustrating one example of an internal configuration of a communication device 100 including a power-supply device according to the present invention.

FIG. 1 is a block diagram illustrating one example of an internal configuration of a communication device 100 including a power-supply device according to the present invention. As illustrated in FIG. 1, the communication device 100 includes a communication processing unit 1 and a power-supply unit 2 as a power-supply device.

The communication processing unit 1 includes: an antenna switch 11; an oscillation circuit 12; a receiving circuit 13; a transmitting circuit 14; a communication control circuit 15; and a standby control circuit 16. When a receiving or transmitting specifying signal RTS specifies a receiving operation, the antenna switch 11 supplies a received signal RX received via an antenna AT connected to an external terminal T1 to the receiving circuit 13. When the receiving or transmitting specifying signal RTS specifies a transmitting operation, the antenna switch 11 supplies a transmitting signal TX sent out from the transmitting circuit 14 to the antenna AT via the external terminal T1. The oscillation circuit 12 generates a local oscillation signal FL having a local oscillation frequency and a carrier signal CA having a carrier frequency on the basis of a reference clock signal CK. The oscillation circuit 12 supplies the local oscillation signal FL to the receiving circuit 13 and supplies the carrier signal CA to the transmitting circuit 14. The receiving circuit 13 performs frequency conversion of the received signal RX on the basis of the local oscillation signal FL. The receiving circuit 13 performs demodulation processing on the thus obtained intermediate frequency signal. The receiving circuit 13 supplies the thus obtained information data to the communication control circuit 15 as received information data RXD. The transmitting circuit 14 modulates the carrier signal CA with transmitting information data TXD to be transmitted and amplifies the modulated carrier signal CA. The transmitting circuit 14 supplies the thus obtained transmitting signal TX to the antenna switch 11.

The communication control circuit 15 supplies the received information data RXD supplied from the receiving circuit 13 to an information reproducing processing unit (not shown) having an image display function and character and voice input and output functions. The communication control circuit 15 supplies the transmitting information data TXD to the transmitting circuit 14 when the transmitting information data TXD is supplied from the information reproducing processing unit. The communication control circuit 15 supplies the receiving or transmitting specifying signal RTS which specifies which one of the transmitting and receiving operations is to be carried out to the antenna switch 11.

A communication main circuit part configured by the oscillation circuit 12, the receiving circuit 13, the transmitting circuit 14, and the communication control circuit 15 performs transmitting and receiving operations of information data.

The standby control circuit 16 generates a communication or standby specifying signal CWS which specifies one of a communication operation mode in which the communication processing unit 1 carries out a communication operation and a standby mode in which the communication processing unit 1 stops the communication operation and thereby cuts the power consumption thereof. The standby control circuit 16 supplies the generated communication or standby specifying signal CWS to the power-supply unit 2. The standby control circuit 16 supplies the communication or standby specifying signal CWS which specifies the communication operation mode to the power-supply unit 2 when a battery B is connected to the power-supply unit 2, for example, or when a main power-supply switch of the communication device 100 is turned to an "ON" state from an "OFF" state, i.e., when the communication device 100 is powered up. Thus, the power-supply unit 2 operates in the communication operation mode as will be described later immediately after the power-up. Thereafter, if no operation is made by a user over a predetermined period, the standby control circuit 16 supplies the communication or standby specifying signal CWS which specifies the standby mode to the power-supply unit 2. Every time a predetermined incoming standby period elapses, the standby control circuit 16 supplies the communication or standby specifying signal CWS which specifies the communication operation mode to the power-supply unit 2 and supplies a receiving command signal which causes the receiving operation to the communication control circuit 15. In response to such a receiving command signal, the communication control circuit 15 supplies the receiving or transmitting specifying signal RTS which specifies the receiving operation to the antenna switch 11 to cause the receiving operation to be carried out in the receiving circuit 13. When no received information data RXD is obtained in the receiving circuit 13, the standby control circuit 16 supplies the communication or standby specifying signal CWS which specifies the standby mode to the power-supply unit 2.

The standby control circuit 16 performs incoming standby processing when the communication main circuit part (12 to 15) is in a standby state by means of the above-described series of processing to be carried out every time the predetermined incoming standby period elapses.

In the communication processing unit 1, the communication main circuit part (12 to 15) is put into an operable state by a power-supply voltage V1 supplied from the power-supply unit 2 through a power supply line L1. The standby control circuit 16 is put into an operable state by the power-supply voltage V1 supplied from the power-supply unit 2 through the power supply line L1 and a power supply line L2 or a power-supply voltage V2 supplied from the power-supply unit 2 through the power supply line L2.

The power-supply unit 2 includes: a main power-supply circuit 21; a standby power-supply circuit 22; switches 23 and 24; and a power-supply switching control circuit 25.

The main power-supply circuit 21 generates the power-supply voltage V1 having one of a first voltage value specified by a voltage specifying signal CV and a second voltage value lower than the first voltage value on the basis of a power-supply voltage VB (for example, 1.5 to 3.6 volts) of the battery B connected to an external terminal T2. Note that the first voltage value represents a power-supply voltage value capable of operating the above-described communication main circuit part (12 to 15) and the first voltage value is 1.3 volts, for example. The second voltage value represents a voltage value same as the voltage value of the power-supply voltage V2 generated in the standby power-supply circuit 22 and the second voltage value is 0.9 volts, for example. When the main power-supply circuit 21 is supplied with the voltage specifying signal CV which specifies the first voltage value, the main power-supply circuit 21 generates the power-supply voltage V1 of 1.3 volts. When the main power-supply circuit 21 is supplied with the voltage specifying signal CV which specifies the second voltage value, on the other hand, the main power-supply circuit 21 generates the power-supply voltage V1 of 0.9 volts. The main power-supply circuit 21 supplies such a power-supply voltage V1 to each of the switch 23, and the oscillation circuit 12, the receiving circuit 13, the transmitting circuit 14, and the communication control circuit 15 as the communication main circuit part through the power supply line L1. The main power-supply circuit 21 stops the receiving of the power-supply voltage VB itself or stops the generating operation of the power-supply voltage V1 by cutting off the electrical connection with the power supply line L1 in response to a power-supply cutoff signal CUT which causes power-supply cutoff. Consequently, the power-supply voltage V1 supplied to the communication processing unit 1 through the power supply line L1 becomes 0 volts and the communication main circuit part (12 to 15) provided in the communication processing unit 1 therefore stops its operation.

Figure 2:
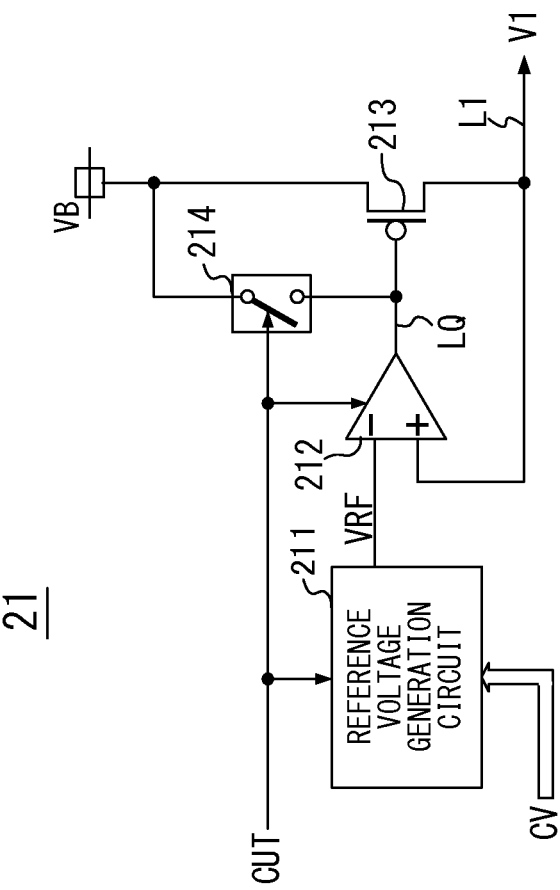
FIG. 2 is a circuit diagram illustrating one example of an internal configuration of a main power-supply circuit 21.

FIG. 2 is an example of a circuit diagram illustrating an internal configuration of the main power-supply circuit 21. As illustrated in FIG. 2, the main power-supply circuit 21 includes: a reference voltage generation circuit 211; an operational amplifier 212; an output transistor 213; and a switch 214.

The reference voltage generation circuit 211 generates a reference voltage VRF having the first voltage value (for example, 1.3 volts) or the second voltage value (for example, 0.9 volts) specified by the voltage specifying signal CV on the basis of the power-supply voltage VB. The reference voltage generation circuit 211 then supplies the reference voltage VRF to an inverting input terminal of the operational amplifier 212. The reference voltage generation circuit 211 stops the receiving of the power-supply voltage VB itself or cuts off the electrical connection with the operational amplifier 212 in response to the power-supply cutoff signal CUT. Consequently, the inverting input terminal of the operational amplifier 212 is set in a 0-volt state or in a high-impedance state. The operational amplifier 212 supplies a differential signal corresponding to a difference between the power-supply voltage V1 sent out onto the power supply line L1 and the reference voltage VRF to a gate terminal of the output transistor 213 through a line LQ. The operational amplifier 212 stops its operation in response to the power-supply cutoff signal CUT. The output transistor 213 is a p-channel MOS (Metal Oxide Semiconductor) type transistor, for example. The power-supply voltage VB is applied to a source terminal of the output transistor 213 and a drain terminal thereof is connected to the power supply line L1 and a non-inverting input terminal of the operational amplifier 212. The switch 214 is set in an ON state (i.e., turned on) in response to the power-supply cutoff signal CUT and supplies the power-supply voltage VB to the gate terminal of the output transistor 213. The output transistor 213 sends out the power-supply voltage V1 having the second voltage value or the first voltage value specified by the voltage specifying signal CV on the basis of the power-supply voltage VB onto the power supply line L1 through the drain terminal thereof. When the power-supply cutoff signal CUT is supplied, the reference voltage generation circuit 211 and the operational amplifier 212 stop their operations and the switch 214 is set in the ON state. Once the switch 214 is set in the ON state, the power-supply voltage VB is supplied to the gate terminal of the output transistor 213 and the output transistor 213 is set in an OFF state (i.e., turned off). Consequently, the power supply line L1 is set in a high-impedance state and the voltage on the power supply line L1 starts transitioning to 0 volts.

The standby power-supply circuit 22 generates the power-supply voltage V2 of 0.9 volts, for example, as a minimum voltage value capable of operating the standby control circuit 16 of the communication processing unit 1, i.e., the above-described second voltage value, on the basis of the power-supply voltage VB of the above-described battery B. The standby power-supply circuit 22 then supplies the power-supply voltage V2 to the switch 24.

The switch 23 is set in an ON state or an OFF state according to a switch signal SW1. In the ON state, the switch 23 electrically connects between the power supply lines L1 and L2. In the OFF state, on the other hand, the switch 23 cuts off the connection between the power supply lines L1 and L2. Thus, the power-supply voltage V1 is applied to the power supply line L2 over a period when the switch 23 is in the ON state.

The switch 24 is set in an ON state or an OFF state according to a switch signal SW2. In the ON state, the switch 24 connects between the standby power-supply circuit 22 and the power supply line L2. In the OFF state, on the other hand, the switch 24 cuts off the connection between the standby power-supply circuit 22 and the power supply line L2. Thus, when the switch 24 is in the ON state, the power-supply voltage V2 generated in the standby power-supply circuit 22 is sent out to the power supply line L2. When the switch 24 is in the OFF state, the sending out of the power-supply voltage V2 to the power supply line L2 is stopped.

Figure 3A:
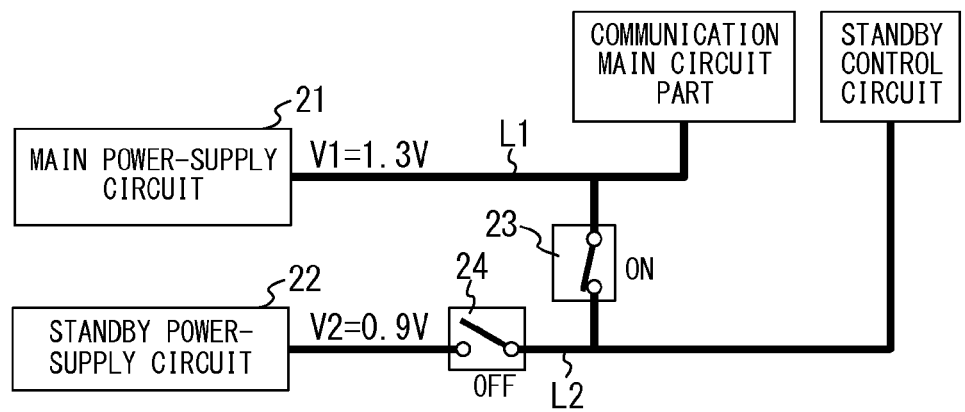
FIGS. 3A and 3B are diagrams illustrating states in a communication operation mode and a standby mode, respectively, in a power-supply unit 2.

When the power-supply switching control circuit 25 is supplied with the communication or standby specifying signal CWS which specifies the communication operation mode from the standby control circuit 16, the power-supply switching control circuit 25 supplies the voltage specifying signal CV which specifies the first voltage value to the main power-supply circuit 21. The power-supply switching control circuit 25 further supplies the switch signal SW1 indicating switch-on to the switch 23 and supplies the switch signal SW2 indicating switch-off to the switch 24. Thus, in the communication operation mode, the switch 23 in the power-supply unit 2 is set in the ON state and the switch 24 is set in the OFF state as illustrated in FIG. 3A and the main power-supply circuit 21 generates the power-supply voltage V1 of 1.3 volts, for example, as the first voltage value. Consequently, the power-supply voltage V1 of 1.3 volts generated by the main power-supply circuit 21 is supplied to the communication main circuit part (12 to 15) through the power supply line L1.

Furthermore, the power-supply voltage V1 is supplied also to the standby control circuit 16 through the power supply line L2.

Figure 3B:
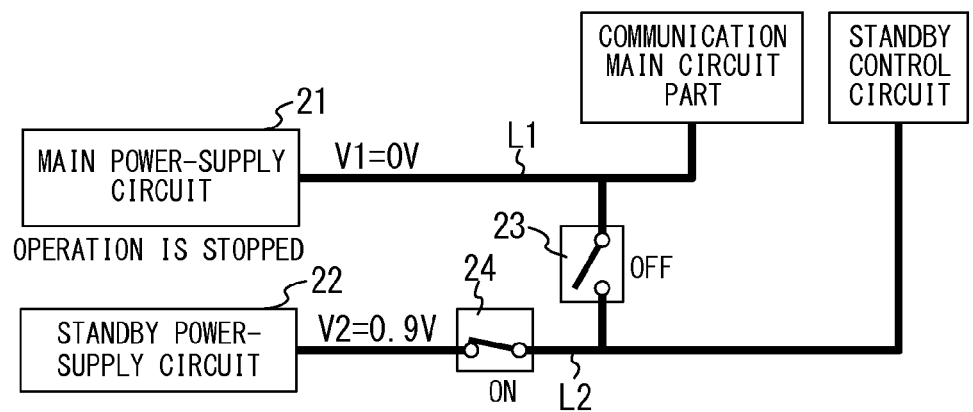

When the power-supply switching control circuit 25 is supplied with the communication or standby specifying signal CWS which specifies the standby mode, the power-supply switching control circuit 25 supplies the power-supply cutoff signal CUT which causes power-supply cutoff to the main power-supply circuit 21. The power-supply switching control circuit 25 further supplies the switch signal SW1 indicating switch-off to the switch 23 and supplies the switch signal SW2 indicating switch-on to the switch 24. Thus, in the standby mode, the switch 23 in the power-supply unit 2 is set in the OFF state and the switch 24 is set in the ON state as illustrated in FIG. 3B and the main power-supply circuit 21 stops its operation. Thus, the power supply from the main power-supply circuit 21 to the communication main circuit part (12 to 15) is stopped and the power-supply voltage V2 of 0.9 volts generated in the standby power-supply circuit 22 is supplied to the standby control circuit 16 through the power supply line L2.

In the communication operation mode, the power-supply unit 2 supplies the power-supply voltage V1 of 1.3 volts, for example, as the first voltage value to the communication main circuit part (12 to 15) through the power supply line L1. The power-supply unit 2 also supplies this power-supply voltage V1 to the standby control circuit 16 through the power supply lines L1 and L2. In the standby mode, the power-supply unit 2 supplies the power-supply voltage V2 of 0.9 volts, for example, as the second voltage value only to the standby control circuit 16 through the power supply line L2. Thus, in such a standby mode, power supply to the communication main circuit part (12 to 15) is cut off and the minimum power-supply voltage capable of operating the standby control circuit 16 is supplied to the standby control circuit 16. Thus, power consumption can be significantly reduced.

Figure 4:
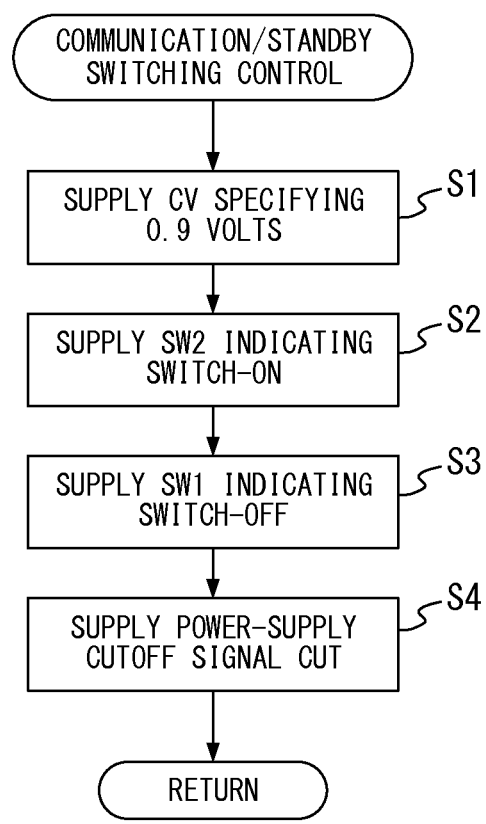
FIG. 4 is a chart showing one example of a communication/standby switching control routine carried out in a power-supply switching control circuit 25.

When performing switching from the above-described communication operation mode to the standby mode, the power-supply switching control circuit 25 performs power-supply switching control according to a communication/standby switching control routine shown in FIG. 4. When switching from the standby mode to the communication operation mode, the power-supply switching control circuit 25 performs power-supply switching control according to a standby/communication switching control routine shown in FIG. 5.

Figure 6A:
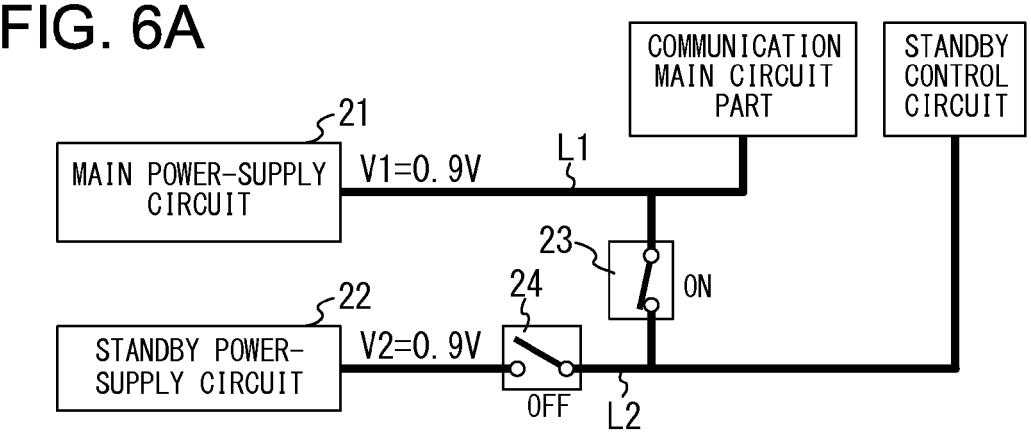
FIGS. 6A to 6C are diagrams illustrating states in the power-supply unit 2 corresponding to respective steps in the communication/standby switching control routine.
Figure 6B:
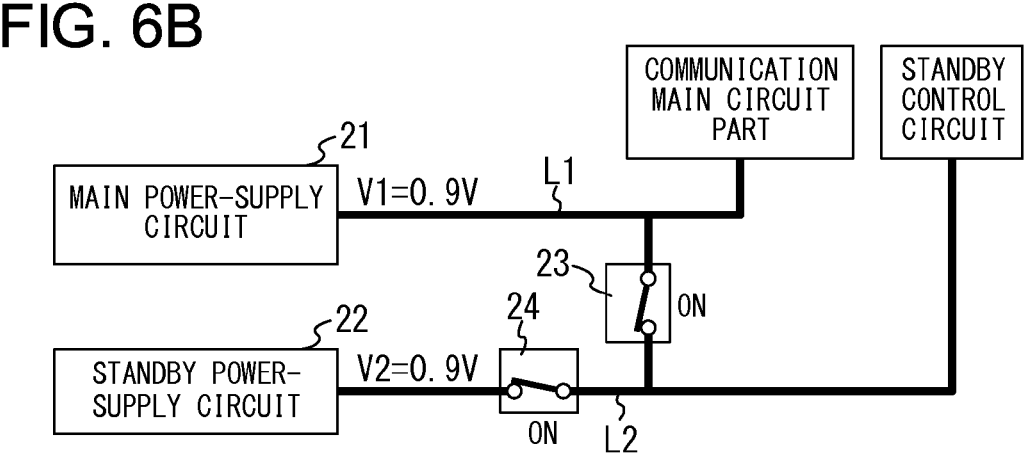
Figure 6C:
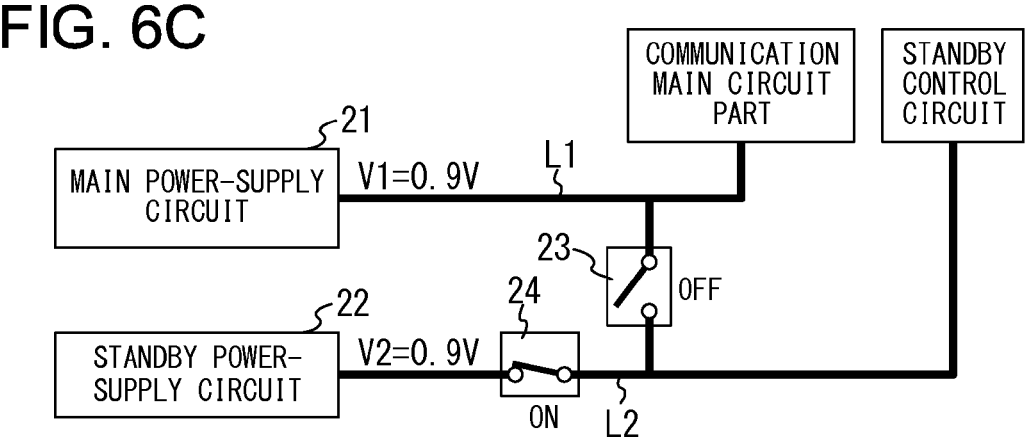

More specifically, when the communication or standby specifying signal CWS transitions from the specification of the communication operation mode to the specification of the standby mode, the power-supply switching control circuit 25 first supplies the voltage specifying signal CV which specifies the second voltage value to the main power-supply circuit 21 among the functional modules (21 to 24) in the communication operation mode illustrated in FIG. 3A according to the communication/standby switching control routine shown in FIG. 4 (step S1). Consequently, the main power-supply circuit 21 switches from the generating state of the power-supply voltage V1 of 1.3 volts to the generating state of the power-supply voltage V1 of 0.9 volts as illustrated in FIG. 6A. Note that the standby power-supply circuit 22 and the switches 23 and 24 keep the state illustrated in FIG. 3A during this period. After a period spent until the voltage value of the power-supply voltage V1 reaches 0.9 volts since the execution of the step S1, for example, 5 µs, has elapsed, the power-supply switching control circuit 25 supplies the switch signal SW2 indicating switch-on to the switch 24 (step S2). Consequently, the switch 24 is set in the ON state as illustrated in FIG. 6B and both of the power-supply voltage V1 of 0.9 volts generated in the main power-supply circuit 21 and the power-supply voltage V2 of 0.9 volts generated in the standby power-supply circuit 22 are applied to the power supply lines L1 and L2. After 1 µs, for example, has elapsed since the execution of the step S2, the power-supply switching control circuit 25 supplies the switch signal SW1 indicating switch-off to the switch 23 (step S3). Consequently, the switch 23 cuts off the connection between the power supply lines L1 and L2 as illustrated in FIG. 6C. After 1 µs, for example, has elapsed since the execution of the step S3, the power-supply switching control circuit 25 supplies the power-supply cutoff signal CUT to the main power-supply circuit 21 (step S4). Consequently, the main power-supply circuit 21 stops the generating operation of the power-supply voltage V1. Therefore, the power-supply unit 2 is set in a state stopping the supply of the power-supply voltage V1 to the communication main circuit part (12 to 15) by the main power-supply circuit 21 and supplying the power-supply voltage V2 of 0.9 volts generated in the standby power-supply circuit 22 to the standby control circuit 16 through the switch 24 and the power supply line L2, i.e., in a standby mode state as illustrated in FIG. 3B.

As described above, when switching the power-supply unit 2 from the communication operation mode to the standby mode, the standby mode state illustrated in FIG. 3B is obtained after sequentially going through the states illustrated in FIGS. 6A to 6C from the communication operation mode state illustrated in FIG. 3A.

Figure 5:
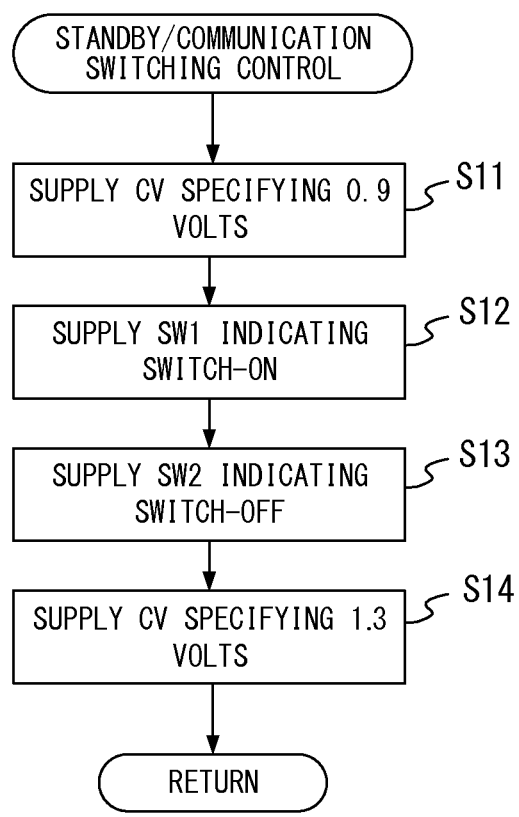
FIG. 5 is a chart showing one example of a standby/communication switching control routine carried out in the power-supply switching control circuit 25.
Figure 7A:
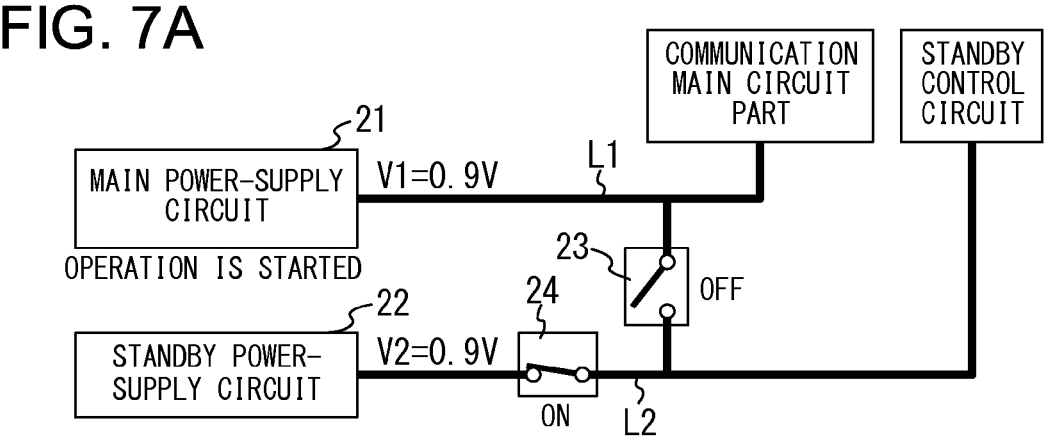
FIGS. 7A to 7C are diagrams illustrating states in the power-supply unit 2 corresponding to respective steps in the standby/communication switching control routine.
Figure 7B:
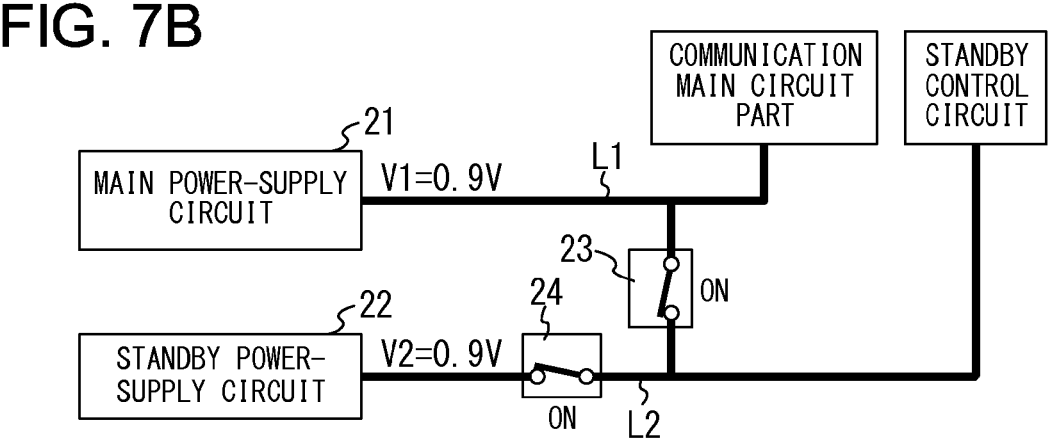
Figure 7C:
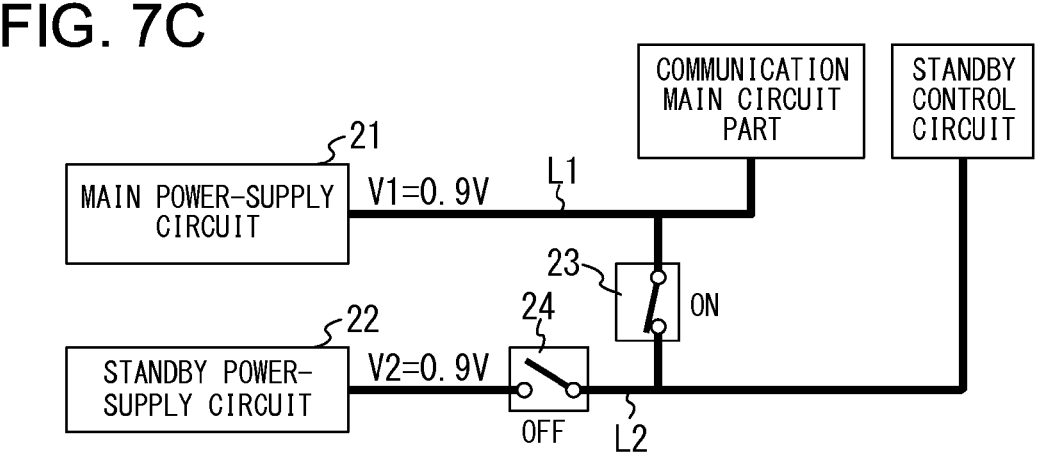

When the communication or standby specifying signal CWS transitions from the specification of the standby mode to the specification of the communication operation mode, on the other hand, the power-supply switching control circuit 25 first supplies the voltage specifying signal CV which specifies the second voltage value to the main power-supply circuit 21 among the functional modules (21 to 24) in the standby mode illustrated in FIG. 3B according to the standby/communication switching control routine shown in FIG. 5 (step S11). Consequently, the main power-supply circuit 21 starts its operation from the operation stopped state illustrated in FIG. 3B, transitions to the generating state of the power-supply voltage V1 of 0.9 volts which is the second voltage value as illustrated in FIG. 7A, and applies this power-supply voltage V1 to the power supply line L1. During this period, the standby power-supply circuit 22 and the switches 23 and 24 keep the state illustrated in FIG. 3B. After a period spent until the voltage value of the power-supply voltage V1 generated in the main power-supply circuit 21 reaches 0.9 volts since the execution of the step S11, for example, 10 µs, has elapsed, the power-supply switching control circuit 25 supplies the switch signal SW1 indicating switch-on to the switch 23 (step S12). Consequently, the switch 23 is set in the ON state so as to connect between the power supply lines L1 and L2 as illustrated in FIG. 7B and both of the power-supply voltage V1 of 0.9 volts generated in the main power-supply circuit 21 and the power-supply voltage V2 of 0.9 volts generated in the standby power-supply circuit 22 are applied to the power supply lines L1 and L2. After 1 µs, for example, has elapsed since the execution of the step S12, the power-supply switching control circuit 25 supplies the switch signal SW2 indicating switch-off to the switch 24 (step S13). Consequently, the switch 24 is set in the OFF state as illustrated in FIG. 7C and the power-supply voltage V2 generated in the standby power-supply circuit 22 is no longer applied to the power supply line L2. After 1 µs, for example, has elapsed since the execution of the step S13, the power-supply switching control circuit 25 supplies the voltage specifying signal CV which specifies the first voltage value to the main power-supply circuit 21 (step S14). Consequently, the main power-supply circuit 21 increases the voltage value of the power-supply voltage V1 from 0.9 volts to 1.3 volts. Therefore, the power-supply unit 2 is set in the state supplying the power-supply voltage V1 of 1.3 volts generated in the main power-supply circuit 21 to the communication main circuit part (12 to 15) through the power supply line L1, i.e., in the communication operation mode state as illustrated in FIG. 3A.

In this manner, when switching the power-supply unit 2 from the standby mode state to the communication operation mode state, the communication operation mode state illustrated in FIG. 3A is obtained after sequentially going through the states illustrated in FIGS. 7A to 7C from the standby mode state illustrated in FIG. 3B.

As described above, the power-supply switching control circuit 25 in the power-supply unit 2 performs the switching of the power-supply voltage in the following manner on each of the communication main circuit part (12 to 15) and the standby control circuit 16 for controlling the operations of this main circuit part in the standby state. More specifically, in the communication operation mode, the power-supply switching control circuit 25 supplies the power-supply voltage V1 having the first voltage value (for example, 1.3 volts) generated in the main power-supply circuit 21 to the communication main circuit part (12 to 15) and the standby control circuit 16 through the first and second power supply lines L1 and L2. In the standby mode, the power-supply switching control circuit 25 stops the operation of the main power-supply circuit 21 and supplies the power-supply voltage V2 having the second voltage value (for example, 0.9 volts) generated in the standby power-supply circuit 22, i.e., having a voltage value which is lower than the power-supply voltage V1 having the first voltage value and minimum to enable the operation of the standby control circuit 16, to the standby control circuit 16 through the second power supply line L2.

Thus, according to such a configuration, the power-supply voltage supplied to the standby control circuit 16 in the standby mode is the power-supply voltage V2 lower than the power-supply voltage V1 having the first voltage value. Therefore, as compared to when the power-supply voltage V1 having the first voltage value is supplied to the standby control circuit 16, power consumption can be reduced.

In the communication operation mode, the power-supply voltage V1 having the first voltage value generated in the main power-supply circuit 21 is applied to the power supply line L2 via the power supply line L1. In the standby mode, the power-supply voltage V2 having the second voltage value generated in the standby power-supply circuit 22 is applied to the power supply line L2. Thus, when switching from the communication operation mode to the standby mode or from the standby mode to the communication operation mode (hereinafter referred to simply as "mode switching"), the first voltage value and the second voltage value lower than the first voltage value are applied to the power supply line. When the first voltage value and the second voltage value are simultaneously applied in such mode switching, a current may flow in toward the standby power-supply circuit 22 from the side of the main power-supply circuit 21, thereby causing the malfunction of the standby control circuit 16 as a result of this current serving as spike noise. Moreover, such a current flowed into the standby power-supply circuit 22 may charge and discharge the parasitic capacitance of the standby power-supply circuit 22, thereby resulting in ineffective power consumption associated with such charging and discharging.

In view of this, in the power-supply switching control circuit 25 of the power-supply unit 2, when switching the power-supply unit 2 from the communication operation mode to the standby mode, the standby mode state illustrated in FIG. 3B is obtained after sequentially going through the states illustrated in FIGS. 6A to 6C from the communication operation mode state illustrated in FIG. 3A. When switching the power-supply unit 2 from the standby mode to the communication operation mode, the communication operation mode state illustrated in FIG. 3A is obtained after sequentially going through the states illustrated in FIGS. 7A to 7C from the standby mode state illustrated in FIG. 3B.

More specifically, when performing the above-described mode switching, the voltage value of the power-supply voltage V1 generated in the main power-supply circuit 21 is first changed to the second voltage value (0.9 volts) same as the power-supply voltage V2 generated in the standby power-supply circuit 22 temporarily as illustrated in FIG. 6A or 7A. Next, the power-supply voltage V2 having the second voltage value generated in the standby power-supply circuit 22 is applied to the power supply lines L1 and L2 together with the power-supply voltage V1 having the second voltage value generated in the main power-supply circuit 21 as illustrated in FIG. 6B or 7B. Thereafter, when transitioning to the standby mode state, the operation of the main power-supply circuit 21 is stopped as illustrated in FIG. 3B after cutting off the connection between the power supply lines L1 and L2 as illustrated in FIG. 6C. When transitioning to the communication operation mode state, the voltage value of the power-supply voltage V1 to be generated in the main power-supply circuit 21 is changed to the first voltage value (1.3 volts) for operating the communication main circuit part (12 to 15) and the standby control circuit 16 as illustrated in FIG. 3A after cutting off the connection between the standby power-supply circuit 22 and the power supply line L2 as illustrated in FIG. 7C.

Thus, according to such power-supply switching control, the first voltage value generated in the main power-supply circuit 21 and the second voltage value generated in the standby power-supply circuit 22 are not simultaneously applied to the power supply lines upon the mode switching. Thus, a current is prevented from flowing into the standby power-supply circuit 22 and the spike noise associated with such a current is therefore prevented from occurring. Thus, the malfunction of the peripheral circuit (standby control circuit 16) resulting from such spike noise and ineffective power consumption due to the current flowed into the standby power-supply circuit 22 in the mode switching can be suppressed.

Figure 8:
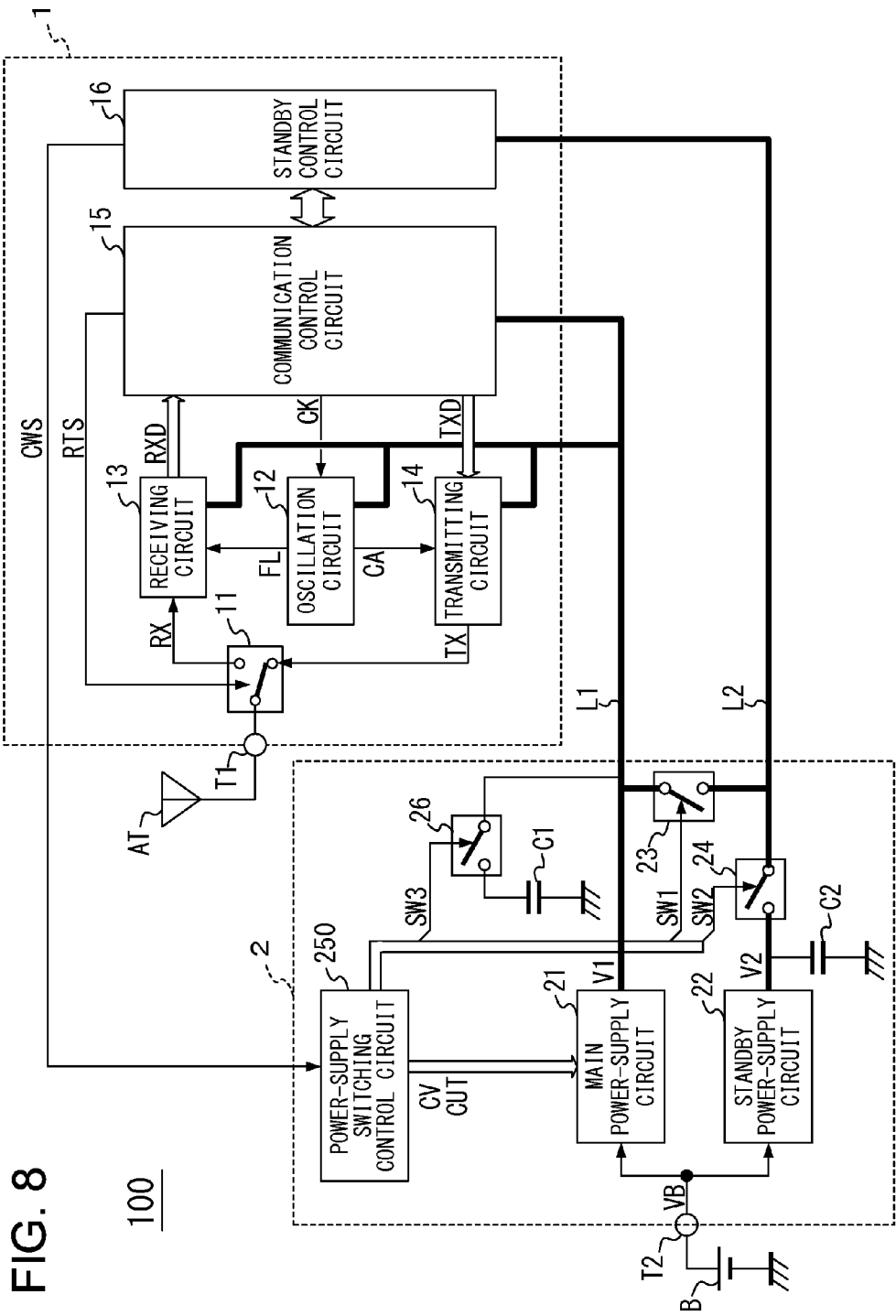
FIG. 8 is a block diagram illustrating another example of the internal configuration of the communication device 100 including the power-supply device according to the present invention.

FIG. 8 is a block diagram illustrating another example of the internal configuration of the communication device 100 in which the power-supply device according to the present invention is mounted. Note that the configuration illustrated in FIG. 8 is the same as that illustrated in FIG. 1 except that a switch 26 and capacitors C1 and C2 are newly provided in the power-supply unit 2 and a power-supply switching control circuit 250 is employed in place of the power-supply switching control circuit 25. Thus, the operation of the power-supply unit 2 illustrated in FIG. 8 will be described below with an emphasis on operations made by the switch 26, the power-supply switching control circuit 250, and the capacitors C1 and C2.

In FIG. 8, the capacitor C1 is a bypass capacitor provided in order to suppress voltage variations on the power supply line L1. One end of the capacitor C1 is set at a ground potential and the other end thereof is connected to the power supply line L1 via the switch 26. When the switch 26 is supplied with a switch signal SW3 indicating switch-on from the power-supply switching control circuit 250, the switch 26 is set in an ON state and electrically connects between the other end of the capacitor C1 and the power supply line L1 at this time. When the switch 26 is supplied with the switch signal SW3 indicating switch-off, the switch 26 is set in an OFF state and sets the other end of the capacitor C1 in a high-impedance state. In other words, the capacitor C1 functions as a bypass capacitor for suppressing voltage variations on the power supply line L1 only when the switch 26 is in the ON state. The capacitor C2 is a bypass capacitor for suppressing variations in the power-supply voltage on the power supply line L2. One end of the capacitor C2 is set at the ground potential and the other end thereof is connected to the line connecting between the standby power-supply circuit 22 and the switch 24 or an output terminal of the standby power-supply circuit 22.

Figure 9A:
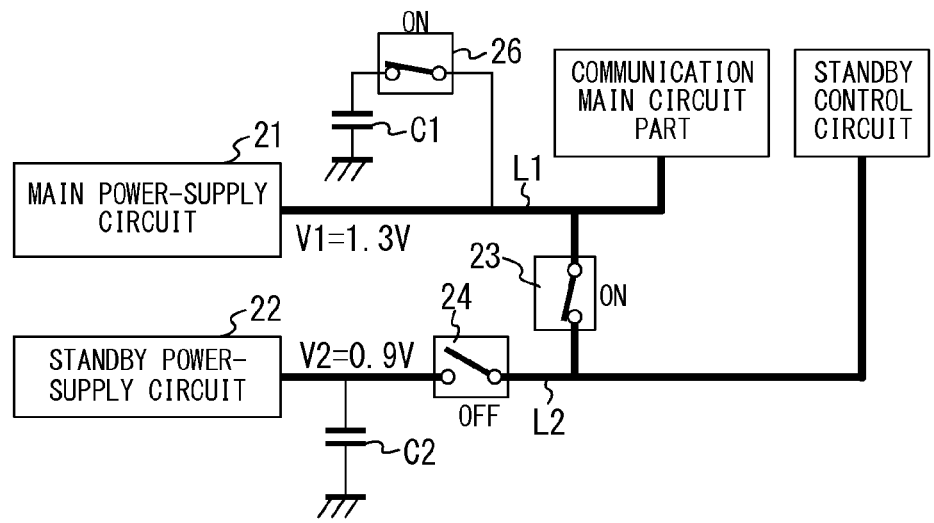
FIGS. 9A and 9B are diagrams illustrating states in the communication operation mode and the standby mode, respectively, in the power-supply unit 2.

In the configuration illustrated in FIG. 8, when the power-supply switching control circuit 250 in the power-supply unit 2 is supplied with the communication or standby specifying signal CWS which specifies the communication operation mode from the standby control circuit 16, the power-supply switching control circuit 250 supplies the voltage specifying signal CV which specifies the first voltage value to the main power-supply circuit 21. The power-supply switching control circuit 250 further supplies the switch signals SW1 and SW3 indicating switch-on to the switches 23 and 26 and supplies the switch signal SW2 indicating switch-off to the switch 24. Thus, in the communication operation mode, the switches 23 and 26 in the power-supply unit 2 are set in the ON state and the switch 24 is set in the OFF state as illustrated in FIG. 9A and the main power-supply circuit 21 generates the power-supply voltage V1 of 1.3 volts, for example, as the first voltage value. Consequently, the power-supply voltage V1 of 1.3 volts generated by the main power-supply circuit 21 is supplied to the communication main circuit part comprising the oscillation circuit 12, the receiving circuit 13, the transmitting circuit 14, and the communication control circuit 15 through the power supply line L1. Furthermore, the power-supply voltage V1 is supplied also to the standby control circuit 16 through the power supply line L2. Moreover, since the capacitor C1 is connected to the power supply line L1, the capacitor C1 functions as a bypass capacitor for suppressing voltage variations on the power supply line L1.

Figure 9B:
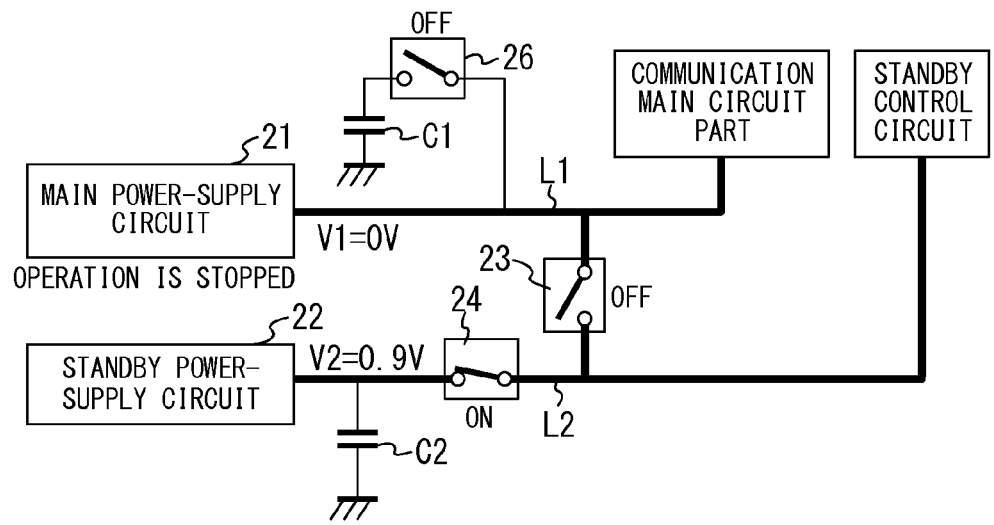

When the power-supply switching control circuit 250 is supplied with the communication or standby specifying signal CWS which specifies the standby mode, the power-supply switching control circuit 250 supplies the power-supply cut-off signal CUT which causes power-supply cutoff to the main power-supply circuit 21. The power-supply switching control circuit 250 further supplies the switch signals SW1 and SW3 indicating switch-off to the switches 23 and 26 and supplies the switch signal SW2 indicating switch-on to the switch 24. Thus, in the standby mode, the switches 23 and 26 in the power-supply unit 2 are set in the OFF state and the switch 24 is set in the ON state as illustrated in FIG. 9B and the main power-supply circuit 21 stops its operation. Thus, the power supply from the main power-supply circuit 21 to the communication main circuit part (12 to 15) is stopped and the power-supply voltage V2 of 0.9 volts generated in the standby power-supply circuit 22 is supplied to the standby control circuit 16 through the power supply line L2. Furthermore, the other end of the capacitor C1 is disconnected from the power supply line L1 and thus set in the high-impedance state.

Thus, also in the configuration illustrated in FIG. 8, the power-supply unit 2 supplies, in the communication operation mode, the power-supply voltage V1 having a voltage value (for example, 1.3 volts) capable of operating the communication main circuit part (12 to 15) to the communication main circuit part (12 to 15) and the standby control circuit 16 through the power supply lines L1 and L2 as with the configuration illustrated in FIG. 1. In the standby mode, the power-supply unit 2 supplies the power-supply voltage V2 having a minimum voltage value capable of operating the standby control circuit 16 only to the standby control circuit 16 through the power supply line L2.

Figure 10:
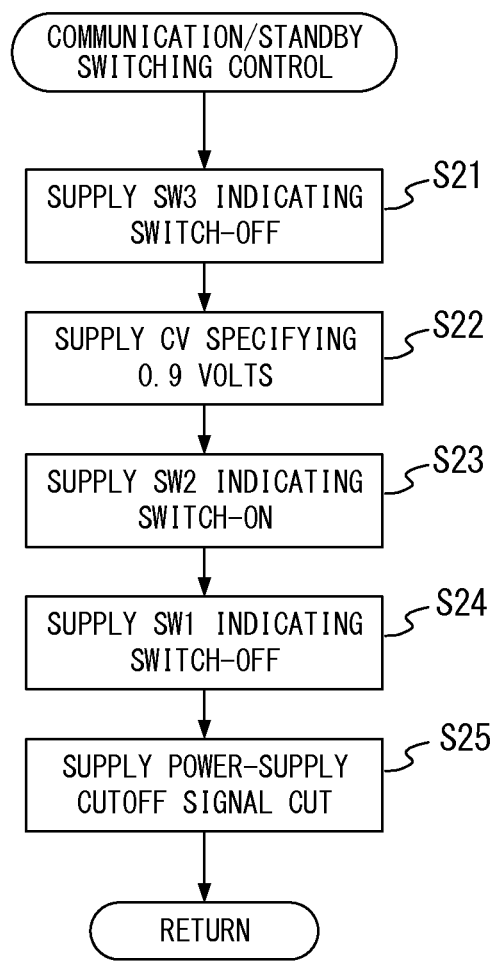
FIG. 10 is a chart showing one example of a communication/standby switching control routine carried out in a power-supply switching control circuit 250.

Here, when performing switching from the communication operation mode to the standby mode, the power-supply switching control circuit 250 performs power-supply switching control according to a communication/standby switching control routine shown in FIG. 10. When switching from the standby mode to the communication operation mode, the power-supply switching control circuit 250 performs power-supply switching control according to a standby/communication switching control routine shown in FIG. 11.

Figure 12A:
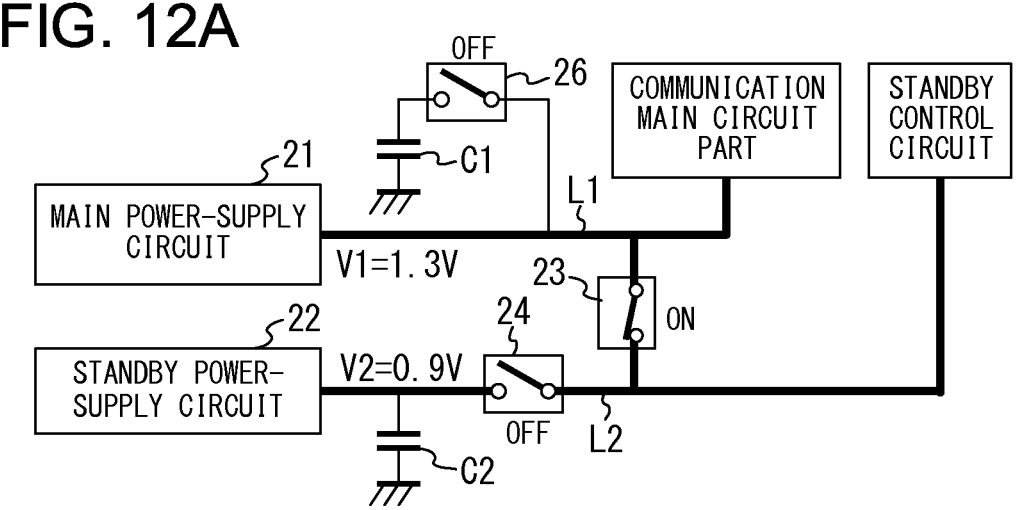
FIGS. 12A and 12B are diagrams illustrating states in the power-supply unit 2 corresponding to respective steps in the communication/standby switching control routine.
Figure 12B:
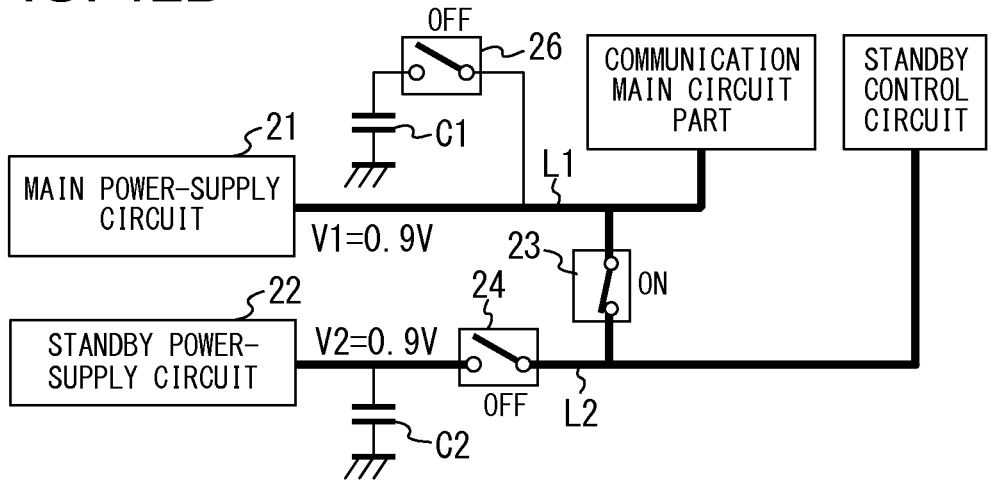
Figure 13A:
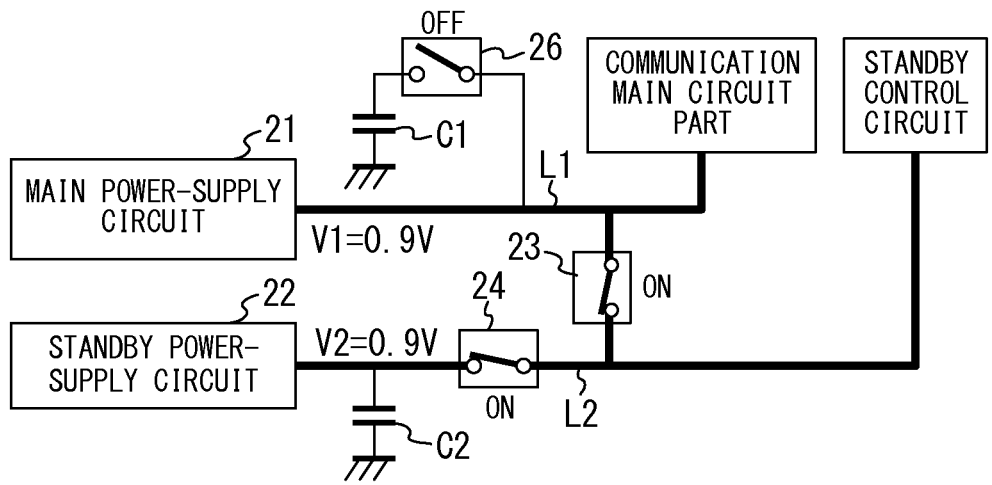
FIGS. 13A and 13B are diagrams illustrating states in the power-supply unit 2 corresponding to respective steps in the communication/standby switching control routine.
Figure 13B:
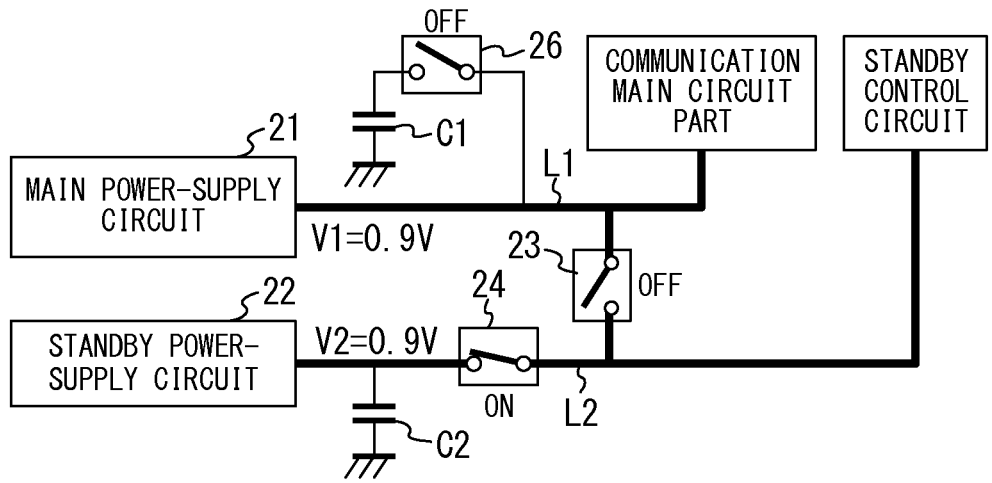

More specifically, when the communication or standby specifying signal CWS transitions from the specification of the communication operation mode to the specification of the standby mode, the power-supply switching control circuit 250 first supplies the switch signal SW3 indicating switch-off to the switch 26 among the functional modules (21 to 24, and 26) in the communication operation mode state illustrated in FIG. 9A according to the communication/standby switching control routine shown in FIG. 10 (step S21). Consequently, the switch 26 is set in the OFF state as illustrated in FIG. 12A and thus cuts off the electrical connection between the other end of the capacitor C1 and the power supply line L1. During this period, the main power-supply circuit 21, the standby power-supply circuit 22, and the switches 23 and 24 keep the state illustrated in FIG. 9A. After 1 µs, for example, has elapsed since the execution of the above-described step S21, the power-supply switching control circuit 250 supplies the voltage specifying signal CV which specifies the second voltage value to the main power-supply circuit 21 (step S22). Consequently, the main power-supply circuit 21 switches from the generating state of the power-supply voltage V1 of 1.3 volts which is the first voltage value to the generating state of the power-supply voltage V1 of 0.9 volts which is the second voltage value as illustrated in FIG. 12B. After a period spent until the voltage value of the power-supply voltage V1 reaches 0.9 volts since the execution of the step S22, for example, 5 µs, has elapsed, the power-supply switching control circuit 250 supplies the switch signal SW2 indicating switch-on to the switch 24 (step S23). Consequently, the switch 24 is set in the ON state as illustrated in FIG. 13A and both of the power-supply voltage V1 of 0.9 volts generated in the main power-supply circuit 21 and the power-supply voltage V2 of 0.9 volts generated in the standby power-supply circuit 22 are applied to the power supply lines L1 and L2. After 1 µs, for example, has elapsed since the execution of the step S23, the power-supply switching control circuit 250 supplies the switch signal SW1 indicating switch-off to the switch 23 (step S24). Consequently, the switch 23 cuts off the connection between the power supply lines L1 and L2 as illustrated in FIG. 13B. After 1 µs, for example, has elapsed since the execution of the step S24, the power-supply switching control circuit 250 supplies the power-supply cutoff signal CUT to the main power-supply circuit 21 (step S25). Consequently, the main power-supply circuit 21 stops the generating operation of the power-supply voltage V1. Thus, the power-supply unit 2 is set in a state stopping the supply of the power-supply voltage V1 to the communication main circuit part (12 to 15) by the main power-supply circuit 21 and supplying the power-supply voltage V2 of 0.9 volts generated in the standby power-supply circuit 22 to the standby control circuit 16 through the switch 24 and the power supply line L2, i.e., in a standby mode state as illustrated in FIG. 9B.

As described above, when switching the power-supply unit 2 from the communication operation mode to the standby mode in the configuration illustrated in FIG. 8, the standby mode state illustrated in FIG. 9B is obtained after sequentially going through the states illustrated in FIGS. 12A, 12B, 13A, and 13B from the communication operation mode state illustrated in FIG. 9A.

Figure 11:
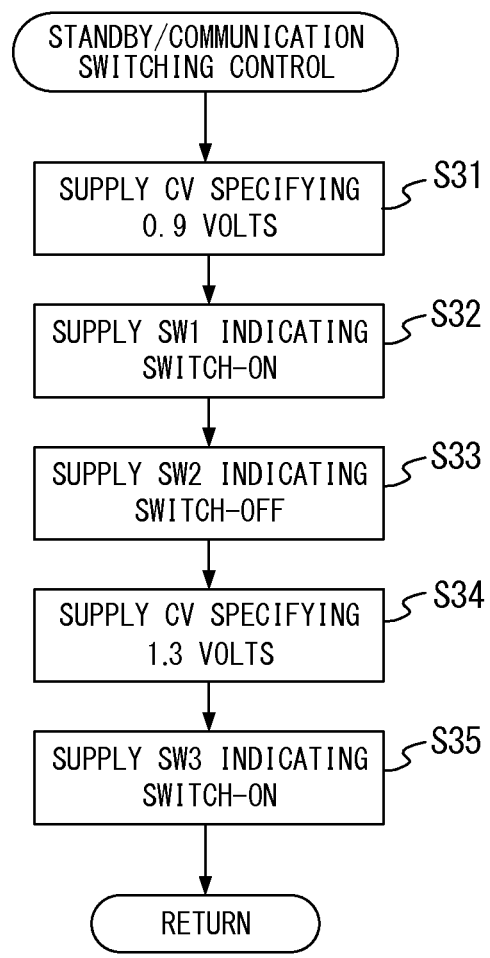
FIG. 11 is a chart showing one example of a standby/communication switching control routine carried out in the power-supply switching control circuit 250.
Figure 14A:
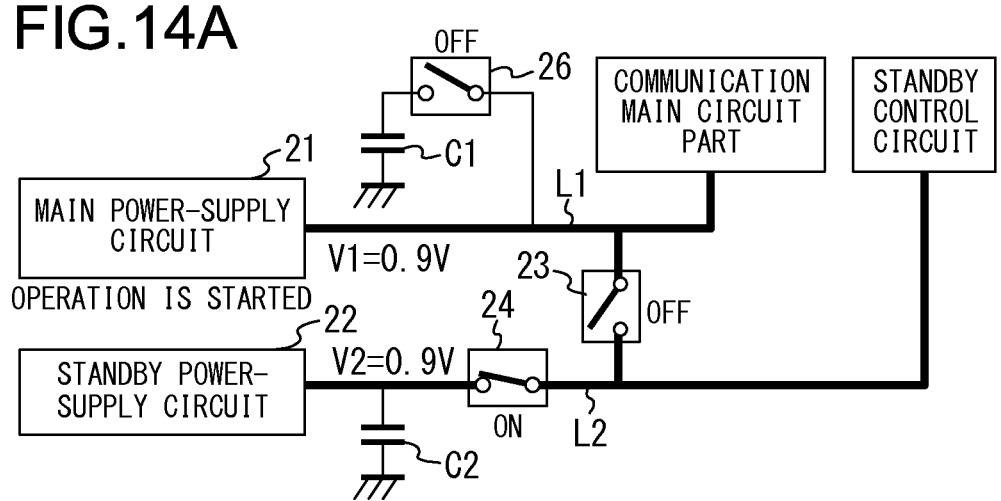
FIGS. 14A and 14B are diagrams illustrating states in the power-supply unit 2 corresponding to respective steps in the standby/communication switching control routine.
Figure 14B:
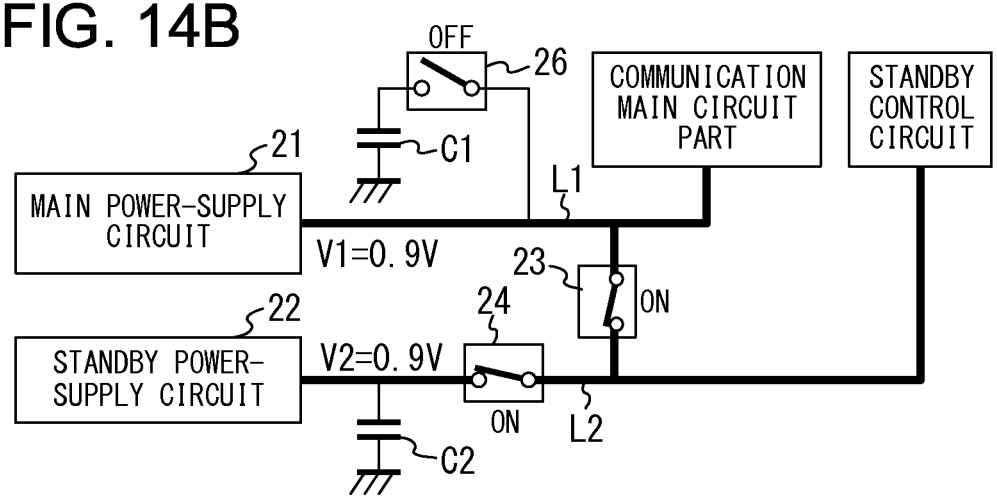
Figure 15A:
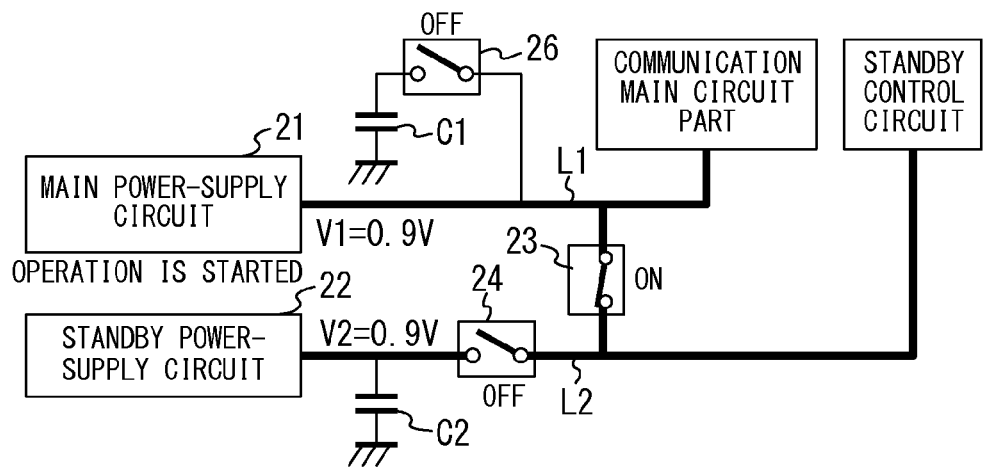
FIGS. 15A and 15B are diagrams illustrating states in the power-supply unit 2 corresponding to respective steps in the standby/communication switching control routine.
Figure 15B:
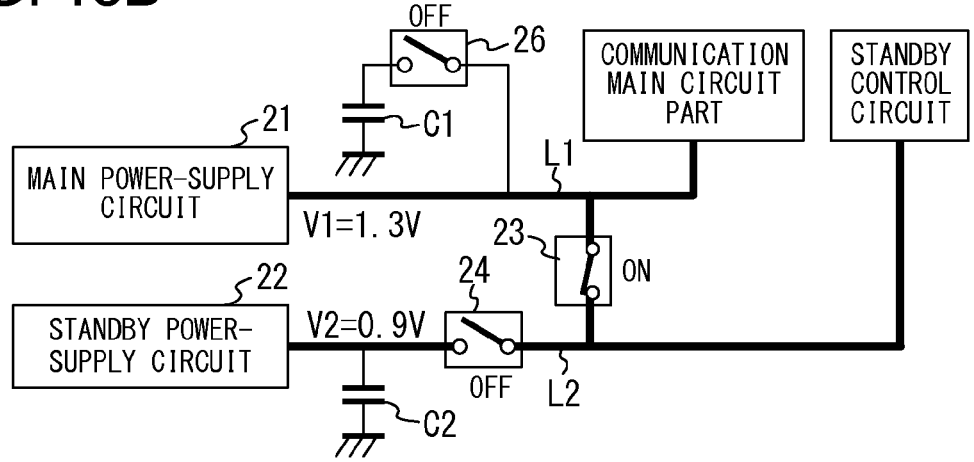

When the communication or standby specifying signal CWS transitions from the specification of the standby mode to the specification of the communication operation mode, the power-supply switching control circuit 250 first supplies the voltage specifying signal CV which specifies the second voltage value to the main power-supply circuit 21 among the functional modules (21 to 24, and 26) in the standby mode state illustrated in FIG. 9B according to the standby/communication switching control routine shown in FIG. 11 (step S31). Consequently, the main power-supply circuit 21 starts its operation from the operation stopped state illustrated in FIG. 9B, transitions to the generating state of the power-supply voltage V1 of 0.9 volts which is the second voltage value as illustrated in FIG. 14A, and applies this power-supply voltage V1 to the power supply line L1. During this period, the standby power-supply circuit 22 and the switches 23, 24, and 26 keep the state illustrated in FIG. 9B. After a period spent until the voltage value of the power-supply voltage V1 generated in the main power-supply circuit 21 reaches 0.9 volts since the execution of the step S31, for example, 10 µs, has elapsed, the power-supply switching control circuit 250 supplies the switch signal SW1 indicating switch-on to the switch 23 (step S32). Consequently, the switch 23 is set in the ON state so as to connect between the power supply lines L1 and L2 as illustrated in FIG. 14B and both of the power-supply voltage V1 of 0.9 volts generated in the main power-supply circuit 21 and the power-supply voltage V2 of 0.9 volts generated in the standby power-supply circuit 22 are applied to the power supply lines L1 and L2. After 1 µs, for example, has elapsed since the execution of the step S32, the power-supply switching control circuit 250 supplies the switch signal SW2 indicating switch-off to the switch 24 (step S33). Consequently, the switch 24 is set in the OFF state as illustrated in FIG. 15A and the power-supply voltage V2 generated in the standby power-supply circuit 22 is no longer applied to the power supply line L2. After 1 µs, for example, has elapsed since the execution of the step S33, the power-supply switching control circuit 250 supplies the voltage specifying signal CV which specifies the first voltage value to the main power-supply circuit 21 (step S34). Consequently, the main power-supply circuit 21 increases the voltage value of the power-supply voltage V1 from 0.9 volts to 1.3 volts. After a period spent until the voltage value of the power-supply voltage V1 generated in the main power-supply circuit 21 reaches 1.3 volts since the execution of the step S34, for example, 10 µs, has elapsed, the power-supply switching control circuit 250 supplies the switch signal SW3 indicating switch-on to the switch 26 (step S35). Thus, the power-supply unit 2 is set in a state supplying the power-supply voltage V1 of 1.3 volts generated in the main power-supply circuit 21 to the communication main circuit part (12 to 15) through the power supply line L1, i.e., in a communication operation mode state as illustrated in FIG. 15B. The capacitor C1 whose connection with the power supply line L1 is cut off in the standby mode as illustrated in FIG. 9B is connected to the power supply line L1 in the communication operation mode and functions as a bypass capacitor for suppressing voltage variations on the power supply line L1.

As described above, when switching the power-supply unit 2 from the standby mode state to the communication operation mode state, the communication operation mode state illustrated in FIG. 9A is obtained after sequentially going through the states illustrated in FIGS. 14A, 14B, 15A, and 15B from the standby mode state illustrated in FIG. 9B.

As stated above, in the power-supply unit 2 illustrated in FIG. 8, the capacitors C1 and C2 are provided in the power supply lines L1 and L2, respectively, as bypass capacitors for suppressing variations in the power-supply voltage. Furthermore, in the power-supply switching control circuit 250 of the power-supply unit 2 illustrated in FIG. 8, the capacitor C2 is provided on the connection line between the standby power-supply circuit 22 and the switch 24 and the switch 26 is provided between the capacitor C1 and the power supply line L1 in order to suppress ineffective power consumption resulting from the charging and discharging of the capacitors C1 and C2 due to the current flowing through the power supply lines in the mode switching.

When switching the power-supply unit 2 from the communication operation mode to the standby mode, the power-supply switching control circuit 250 sequentially carries out the steps S22 to S25 similar to the steps S1 to S4 carried out by the power-supply switching control circuit 25 as shown in FIG. 10. Note however that the step S21 for cutting off the connection between the capacitor C1 and the power supply line L1 by setting the switch 26 in the OFF state is carried out in the power-supply switching control circuit 250 immediately before the step S22 as shown in FIG. 10. When switching the power-supply unit 2 from the standby mode state to the communication operation mode state, the power-supply switching control circuit 250 sequentially carries out the steps S31 to S34 similar to the steps S11 to S14 carried out by the power-supply switching control circuit 25. Note however that the step S35 for connecting between the capacitor C1 and the power supply line L1 by setting the switch 26 in the ON state is carried out in the power-supply switching control circuit 250 immediately after the step S34 as shown in FIG. 11. According to the above-described step S21 or S35, the capacitor C1 retains electric charge associated with the first voltage value (1.3 volts) being applied thereto through the power supply line L1 in the communication operation mode over the period in the standby mode state. Thus, upon being switched to the communication operation mode thereafter, charging and discharging do not occur in the capacitor C1. Therefore, ineffective power consumption associated with the charging and discharging of the capacitor C1 can be suppressed.

In the power-supply unit 2 illustrated in FIG. 1 or 8, the standby power-supply circuit 22 which operates in the standby mode has an extremely small internal bias current in order to reduce the power consumption thereof. Thus, it may take a long time for the voltage value of the power-supply voltage V2 to reach a desired second voltage value (for example, 0.9 volts) after the operation of the standby power-supply circuit 22 is started. In view of this, the power-supply unit 2, in such a case, is first activated in the communication operation mode in response to the power-up of the communication device 100. This facilitates the stabilization of the standby power-supply circuit 22 as a result of the current flowing from the main power-supply circuit 21 toward the standby power-supply circuit 22 when the power supply lines L1 and L2 are connected together as illustrated in FIG. 6B, for example. Therefore, speeding up in the start-up time can be achieved. When the standby power-supply circuit 22 having a long start-up time is employed, a high-speed operation can be achieved by setting the standby power-supply circuit 22 in an always-on state as shown in the above-described embodiments. When the standby power-supply circuit 22 having a short start-up time is employed, the power-supply switching control circuit 25 or 250 may stop the operation of the standby power-supply circuit 22 in association with the setting of the switch 24 in the OFF state. Alternatively, when the standby power-supply circuit 22 having a short start-up time is employed, the power-supply unit 2 may be operated in the standby mode first in response to the power-up of the communication device 100.

In the above-described embodiments, the power-supply voltage value for operating the communication main circuit part (12 to 15) and the standby control circuit 16, i.e., the first voltage value, is set to 1.3 volts. The minimum power-supply voltage value for operating the standby control circuit 16, i.e., the second voltage value, is set to 0.9 volts. However, these first voltage value and second voltage value are not limited to 1.3 volts and 0.9 volts, respectively. For example, negative voltage values may be employed.

In the power-supply switching control circuit 250 illustrated in FIG. 8, when switching from the standby mode to the communication operation mode, the step S35 for connecting between the capacitor C1 and the power supply line L1 by setting the switch 26 in the ON state is carried out after the step S34 as shown in FIG. 11. However, the timing at which the step S35 is carried out may be any timing before the step S34.

As described above, the communication device illustrated in FIG. 1 or 8 is provided with the power-supply device (2) which sends out the first power-supply voltage (V1) having the first voltage value to the first power supply line (L1) and the second power supply line (L2) in the first mode (communication operation mode) and sends out the second power-supply voltage (V2) having the second voltage value lower than the first voltage value to the second power supply line in the second mode (standby mode). Such a power-supply device includes the following first power-supply circuit (21), the second power-supply circuit (22), the first switch (23), the second switch (24), and the power-supply switching control circuit (25, 250). In sum, the first power-supply circuit generates the first power-supply voltage having the voltage value of one of the first and second voltage values and sends out the first power-supply voltage to the first power supply line. The second power-supply circuit generates the second power-supply voltage. Whereas the first switch connects between the first and second power supply lines in the ON state, the first switch cuts off the connection between the first and second power supply lines in the OFF state. Whereas the second switch connects between the second power-supply circuit and the second power supply line in the ON state, the second switch cuts off the connection between the second power-supply circuit and the second power supply line in the OFF state. When the power-supply switching control circuit switches the state of the power-supply device from the first mode to the second mode, the second mode state is obtained by: first changing the voltage value of the first power-supply voltage to be generated in the first power-supply circuit to the second voltage value (S1, S22); setting the second switch in the ON state next (S2, S23); subsequently setting the first switch in the OFF state (S3, S24); and then stopping the operation of the first power-supply circuit (S4, S25). Also, when the power-supply switching control circuit switches the state of the power-supply device from the second mode to the first mode, the power-supply switching control circuit first generates the first power-supply voltage having the second voltage value in the first power-supply circuit (S11, S31), sets the first switch in the ON state next (S12, S32), subsequently sets the second switch in the OFF state (S13, S33), and then changes the voltage value of the first power-supply voltage to be generated in the first power-supply circuit to the first voltage value (S14, S34). In this manner, the first mode state is obtained.

What is claimed is:

1. A power-supply device for sending out a first power-supply voltage having a first voltage value to a first power supply line and a second power supply line in a first mode and sending out a second power-supply voltage having a second voltage value lower than the first voltage value to the second power supply line in a second mode, the power-supply device comprising:
   a first power-supply circuit that generates the first power-supply voltage having the voltage value of one of the first and second voltage values and sends out the first power-supply voltage to the first power supply line;
   a second power-supply circuit that generates the second power-supply voltage;
   a first switch that connects between the first and second power supply lines in an ON state and cuts off the connection between the first and second power supply lines in an OFF state;
   a second switch that connects between the second power-supply circuit and the second power supply line in the ON state and cuts off the connection between the second power-supply circuit and the second power supply line in the OFF state; and
   a power-supply switching control circuit that when switching from the first mode to the second mode, the second mode state is obtained by: changing the voltage value of the first power-supply voltage to be generated in the first power-supply circuit to the second voltage value;
then setting the second switch in the ON state;
subsequently setting the first switch in the OFF state; and
then stopping the operation of the first power-supply circuit,
and when switching from the second mode to the first mode, the first mode state is obtained by: generating the first power-supply voltage having the second voltage value in the first power-supply circuit; then setting the first switch in the ON state; subsequently setting the second switch in the OFF state; and then changing the voltage value of the first power-supply voltage to be generated in the first power-supply circuit to the first voltage value.

2. The power-supply device according to claim 1, wherein
   the power-supply switching control circuit generates the first power-supply voltage having the first voltage value in the first power-supply circuit and sends out the first power-supply voltage to the first and second power supply lines by setting the first switch in the ON state and the second switch in the OFF state in the first mode, and
   the power-supply switching control circuit stops the operation of the first power-supply circuit and sends out the second power-supply voltage to the second power supply line by setting the first switch in the OFF state and the second switch in the ON state in the second mode.

3. The power-supply device according to claim 1, further comprising:
   a first capacitor with one end thereof being set at a ground potential;
   a third switch that connects between other end of the first capacitor and the first power supply line in an ON state and cuts off the connection between the other end of the first capacitor and the first power supply line in an OFF state; and
   a second capacitor with one end thereof being set at the ground potential and other end thereof being connected to the second power supply line, wherein
   the power-supply switching control circuit sets the third switch in the ON state in the first mode and sets the third switch in the OFF state in the second mode.

4. The power-supply device according to claim 1, wherein the power-supply switching control circuit stops the operation of the second power-supply circuit in association with the setting of the second switch in the OFF state.

5. The power-supply device according to claim 1, wherein the power-supply switching control circuit carries out the operation of the first mode immediately after power-up.

6. A method for controlling a power-supply device that connects between a first power supply line and a second power supply line so as to send out a first power-supply voltage having a first voltage value to the first and second power supply lines in a first mode and cuts off the connection between the first and second power supply lines so as to send out a second power-supply voltage having a second voltage value lower than the first voltage value to the second power supply line in a second mode, wherein
   when switching from the first mode state to the second mode, the second mode state is obtained by sequentially carrying out the steps of: changing the voltage value of the first power-supply voltage to the second voltage value; sending out the second power-supply voltage to the second power supply line; cutting off the connection between the first and second power supply lines; and stopping a generating operation of the first power-supply voltage; and
   when switching from the second mode state to the first mode, the first mode state is obtained by sequentially carrying out the steps of: starting the generating operation of the first power-supply voltage having the second voltage value; connecting between the first and second power supply lines; stopping the sending out of the second power-supply voltage to the second power supply line; and changing the voltage value of the first power-supply voltage to the first voltage value.

7. A communication device comprising: a communication main circuit part that transmits and receives information data; a standby control circuit that performs incoming standby processing when the communication main circuit part is in a standby state; and a power-supply unit that supplies a first power-supply voltage having a first voltage value to the communication main circuit part and the standby control circuit through a first power supply line and a second power supply line in a communication operation mode and supplies a second power-supply voltage having a second voltage value lower than the first voltage value to the standby control circuit through the second power supply line in a standby mode, wherein
   the power-supply unit includes:
      a first power-supply circuit that generates the first power-supply voltage having the voltage value of one of the first and second voltage values and sends out the first power-supply voltage to the first power supply line;
      a second power-supply circuit that generates the second power-supply voltage;
      a first switch that connects between the first and second power supply lines in an ON state and cuts off the connection between the first and second power supply lines in an OFF state;
      a second switch that connects between the second power-supply circuit and the second power supply line in an ON state and cuts off the connection between the second power-supply circuit and the second power supply line in an OFF state; and a power-supply switching control circuit that when switching from the communication operation mode to the standby mode, the standby mode state is obtained by: changing the voltage value of the first power-supply voltage to be generated in the first power-supply circuit to the second voltage value; then setting the second switch in the ON state; subsequently setting the first switch in the OFF state; and then stopping the operation of the first power-supply circuit, and when switching from the standby mode to the communication operation mode, the communication operation mode state is obtained by: generating the first power-supply voltage having the second voltage value in the first power-supply circuit; then setting the first switch in the ON state; subsequently setting the second switch in the OFF state; and then changing the voltage value of the first power-supply voltage to be generated in the first power-supply circuit to the first voltage value.

* * * * *